US008412767B2

(12) United States Patent
Ho et al.

(10) Patent No.: US 8,412,767 B2
(45) Date of Patent: Apr. 2, 2013

(54) MOBILE CONTENT SERVICE

(75) Inventors: Matthew Jonathan Ho, Ashburn, VA (US); Brendan McLean, Chantilly, VA (US)

(73) Assignee: Network Solutions Inc., Herndon, VA (US)

( * ) Notice: Subject to any disclaimer, the term of this patent is extended or adjusted under 35 U.S.C. 154(b) by 287 days.

(21) Appl. No.: 12/175,342

(22) Filed: Jul. 17, 2008

(65) Prior Publication Data

US 2009/0024698 A1    Jan. 22, 2009

Related U.S. Application Data

(60) Provisional application No. 60/950,520, filed on Jul. 18, 2007.

(51) Int. Cl.
*G06F 15/16* (2006.01)
(52) U.S. Cl. ........ 709/203; 709/217; 709/218; 709/219; 709/224; 455/445; 455/405; 455/466
(58) Field of Classification Search ............... 709/203, 709/217–219, 224; 455/445, 405, 466
See application file for complete search history.

(56) References Cited

U.S. PATENT DOCUMENTS

| 7,114,007    | B2 * | 9/2006  | Sasaki            | 709/246   |
|--------------|------|---------|-------------------|-----------|
| 7,299,050    | B2   | 11/2007 | Delaney et al.    |           |
| 2002/0013657 | A1 * | 1/2002  | Narioka et al.    | 701/200   |
| 2002/0073235 | A1 * | 6/2002  | Chen et al.       | 709/246   |
| 2004/0172484 | A1 * | 9/2004  | Hafsteinsson et al.| 709/246  |
| 2004/0259553 | A1 * | 12/2004 | Delaney et al.    | 455/445   |
| 2005/0215236 | A1 * | 9/2005  | Myka et al.       | 455/414.1 |
| 2007/0093258 | A1 * | 4/2007  | Steenstra et al.  | 455/456.5 |
| 2007/0094042 | A1 * | 4/2007  | Ramer et al.      | 705/1     |
| 2008/0172373 | A1 * | 7/2008  | Jenson et al.     | 707/5     |

OTHER PUBLICATIONS

International Search Report and Written Opinion, mailed on Oct. 22, 2008, in related International Application No. PCT/US08/70497, filed Jul. 18, 2008.

* cited by examiner

*Primary Examiner* — Wing F Chan
*Assistant Examiner* — Benjamin M Thieu
(74) *Attorney, Agent, or Firm* — Morris & Kamlay LLP

(57) ABSTRACT

Standard content created for use on non-mobile platforms, such as personal computers, is made available and useful to mobile devices. A request for content from a mobile device is sent to a mobile server using the DNS or a redirect from a standard content server. The mobile server obtains the standard content and normalizes it for use on the mobile device. The normalized content is sent to the requesting mobile device.

13 Claims, 4 Drawing Sheets

MOBILE CONTENT SERVICE

CROSS-REFERENCE TO RELATED APPLICATIONS

This application claims the benefit of U.S. provisional patent application 60/950,520, "Mobile Content Service," filed on Jul. 18, 2007.

FIELD OF THE INVENTION

The field of the invention relates to computer networking, and in particular, providing content suitable for display and interaction on a first device or type of device (such as a mobile device) based upon content that was originally created and formatted for display on a second device or type of device (e.g., a non-mobile platform, such as a personal computer.)

BACKGROUND OF THE INVENTION

The increasing number and capabilities of mobile devices is causing a growing demand for web-based content that is easy to understand and interact with on such devices. However, there have been numerous impediments to satisfying this demand. Mobile devices tend to have a small screen, not only because of size limitations, but also because of power consumption and battery-life concerns. Examples of mobile devices include cell phones, handheld computers, etc. Bandwidth limitations also complicate this matter because wireless communication techniques can have problems handling the large data interchange that can more easily be processed on a broadband connection for a typical standard computing device, such as a laptop or a desktop computer. Also, mobile input devices (e.g., keypads) can be more limited than traditional, Personal Computer (PC) based input devices, such as full-sized keyboards and mice.

There is a need for making standard web content available in a mobile format more suitable to the capabilities of mobile devices. An example of standard web content is a web site adapted to be rendered by a personal computer, such as a desktop or laptop computer. Certain known solutions to overcome this problem have been deployed, but have not been widely successful or widely adopted. In one solution, a content provider creates and stores two versions of its web site on the Internet. The first version is the standard one designed to be used with a PC. The other version mirrors the first, but is stripped down for mobile applications. When a user request is received, the request is analyzed to determine if it originated from a mobile device and, if so, the mobile version is served. This two-version solution can be expensive. Two different but coherent sites must be created and updated, rather than one site. Further, each site is usually associated with a distinct domain name, so a user must remember two such names to reach the site on a PC or mobile device.

Another solution requires only a single web site and applies dynamic styling (via web site stylesheets) to render a version of the regular web site to mobile devices. Unfortunately, this requires additional development efforts in order to achieve a consistent look and feel across multiple client devices.

Another solution requires mobile users to browse web sites using a proxy service that is explicitly engaged by the mobile user, such as an Internet search engine. A capable Internet search engine would detect the mobile device employed by the user, and would automatically render all web sites appearing in search results in such a manner that is compatible with the majority of mobile devices. This mobile compatible rendering is only presented when users utilize an Internet search engine that provides this inherent service. The same mobile user may browse directly to a web site and then not receive the mobile compatible rendering because they did not reach the web site through search results presented by an Internet search engine with these mobile device detection and proxy capabilities.

What is needed is a way to easily provide web content to a user in a way that is effective for both mobile and non-mobile devices while minimizing the burden on the content provider of providing such content, that is easier to see and understand and that doesn't require separate web sites for mobile devices and non-mobile platforms.

SUMMARY OF THE INVENTION

A request for content can be received at a web server that hosts standard content. When the request is determined to have originated from a mobile device, the request can be redirected to a standard-to-mobile conversion server. The web server can receive a reverse proxy call from the standard-to-mobile conversion server for the standard content as requested by the mobile device user. The requested content can be sent to the standard-to-mobile conversion server, which can convert it to mobile content and send it to the requesting user.

DETAILED DESCRIPTION OF THE INVENTION

Figure 1:
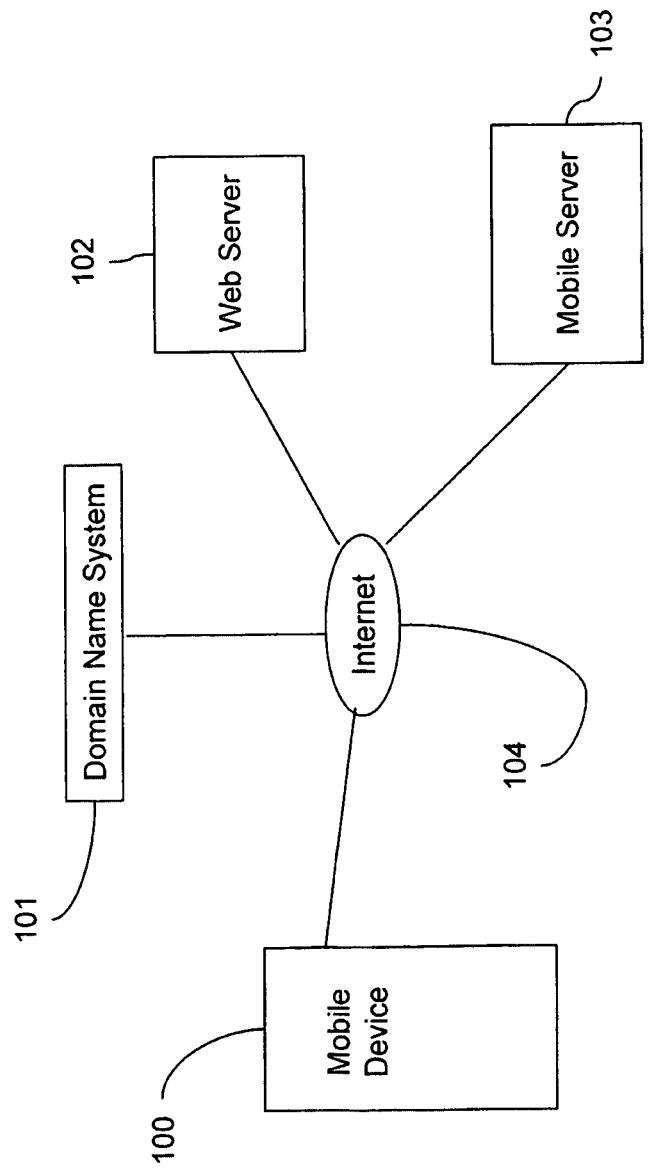
FIG. 1 illustrates a block diagram of a system for generating and transmitting mobile content in accordance with an embodiment of the present invention.

In accordance with an embodiment of the present invention, a system and method can properly route a request for web content that originates from a mobile device, convert existing web content designed for non-mobile end users into mobile-compatible content and deliver such content to the requesting mobile device. In general, the present invention can be used to handle a request that originates from any kind of device and convert content from a first format to a second format suitable to be rendered on the requesting device.

In various embodiments of the present invention, a web server may be represented by multiple web servers virtualized as a single, logical web server accessible via a single URL or IP address.

In one embodiment, the same URL and web server is used to access both mobile information ("mobile content") and non-mobile information ("standard content"). The request can be sent to a web server that is capable of determining whether the requester is a mobile or non-mobile device, e.g., based upon information contained in the HTTP request, such as utilizing the user-agent field in the HTTP request. If the request is from a non-mobile device, the locally available, non-mobile content is served unaltered. If the request is from a mobile device, the web server converts the locally available, non-mobile content to mobile compatible content in real-time, and returns it to the requesting mobile end user. In this way, the same domain name can be used in accordance with an embodiment of the present invention to transparently present a web site in a rendering suitable for users using devices of differing capabilities.

Alternatively, a different URL can be used specifically for handling mobile content requests. For example, www.content.com can be used to request non-mobile content, while mobile.content.com or content.mobi can be used to request mobile content. In each case, the Domain Name System (DNS) can return one or more distinct IP addresses for the non-mobile web server and mobile web server. The web server answering for www.content.com (non-mobile) can detect the requesting mobile device and return an HTTP redirect, forcing the mobile device to re-issue its original request to the content.mobi web server. Upon receiving this request, the content.mobi web server can identify the location of the authoritative content at www.content.com, and using a reverse proxy mechanism and real-time transform, return a mobile-compatible rendering of the content.

The web site that includes the requested content can be hosted by the mobile server service provider or a remote ISP. Only a single web site need be maintained in accordance with the present invention. That is, no separate mobile and non-mobile web sites need be maintained. If the web site is hosted by the mobile server provider and a request for mobile content is received, the mobile server can transform the web content in real-time to mobile-device-compatible content that is easy to understand and to use. In one embodiment, this is done by normalizing (converting) the HTML version of the requested content output from the hosting web site to XHTML-MP. The XHTML-MP content is then served to the requesting mobile device.

If the content is hosted on a web server remote from the mobile server (e.g., by a remote ISP), then a reverse proxy call can be made by the mobile server to the remote server. HTML-based content can be obtained from the remote server, normalized (converted) by the mobile server to XHTML-MP or any other suitable mobile format and then served to the requesting mobile device.

FIG. 1 illustrates a block diagram of a system for generating and transmitting mobile content in accordance with one embodiment of the present invention. A mobile device 100, the Domain Name System 101, a web server 102 and a mobile server 103 are coupled through a network 104 such as the Internet. Mobile server 103 can also be known as a standard to mobile conversion server. The mobile device 100 may be any device that is operative to generate a content request, such as a mobile phone, a smart phone, an internet-enabled personal digital assistant or any other suitable type of mobile communication device capable of requesting and receiving Internet content.

Figure 2:
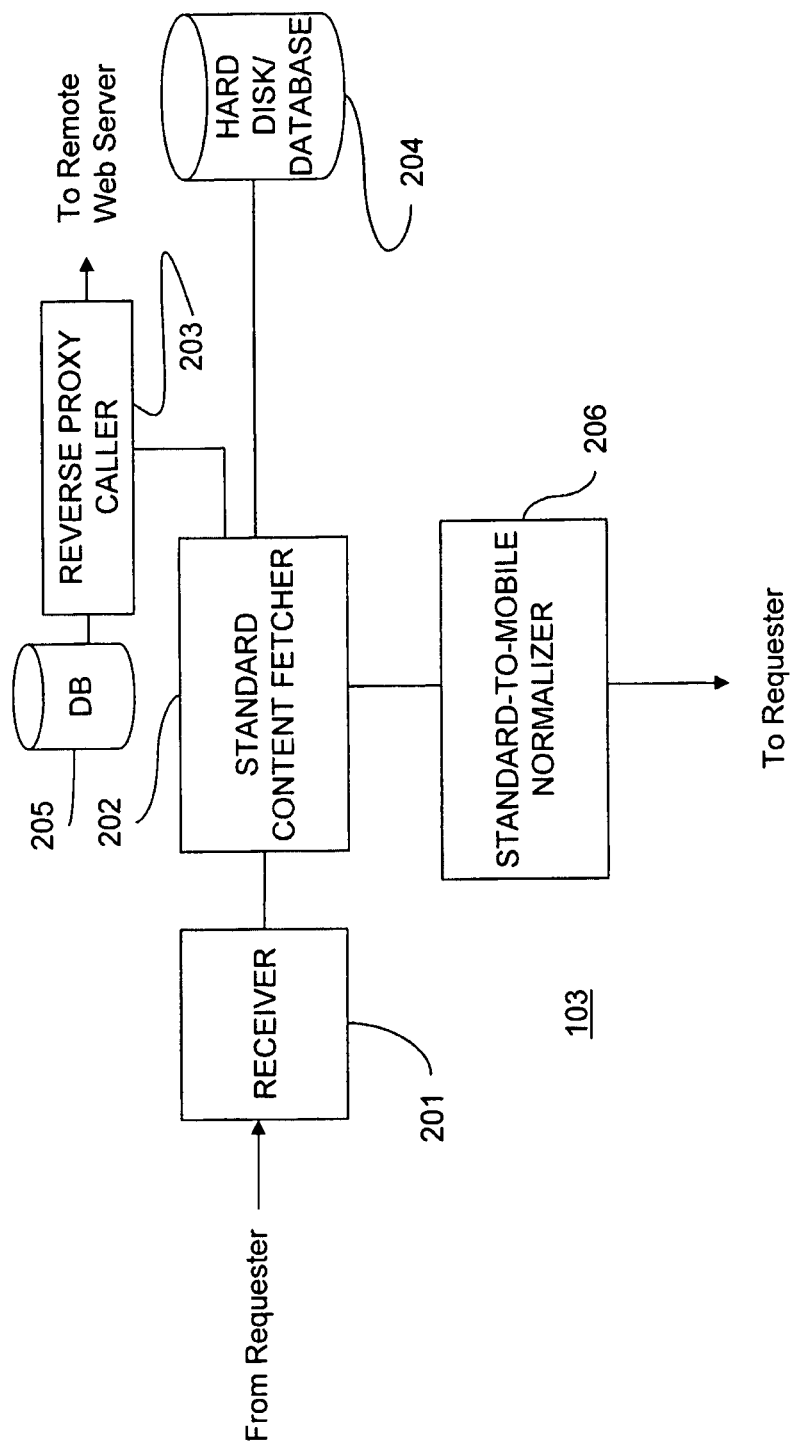
FIG. 2 illustrates a block diagram of a mobile server for providing mobile content in accordance with an embodiment of the present invention.

FIG. 2 illustrates a block diagram of a mobile server for generating and providing mobile content. A receiver module 201 receives HTTP requests for web content from a mobile device over a network (not shown) such as the Internet. An HTML-based content fetcher 202 obtains web content based upon the request. Here, HTML content is not meant to be limited to HTML script, but can include any and all of the content normally associated with a web page, as well as associated software functionality, e.g., as implemented in Java, JavaScript, etc. The HTML-based content is obtained by the content fetcher 202 from a remote web server by invoking a reverse proxy call module 203 or from a local storage site, such as a hard disk or database 204. The location of a remotely hosted web server that stores the content sought in the request from the mobile device can be found by performing a lookup in a database 205. The database 205 can correlate information received in a request with the location of a remote web server. For example, if a request is received for content.mobi, the database 205 can include a record that correlates content.mobi with content.com. The incoming content.mobi request causes a request for content to be issued by the reverse proxy call module 203 to content.com.

Once the content is obtained, it can be converted (normalized) to mobile-compatible formats using a normalization module 206. The normalization module 206 then sends the normalized content (e.g., using XHTML-MP) to the requesting mobile device.

The mobile server 103 can include one or more microprocessors coupled to memory that stores instructions adapted to be executed by the processors. The processors can include a general purpose microprocessor and/or an Application Specific Integrated Circuit. Memory can be any device capable of storing digital information, such as RAM, ROM, a hard disk, flash memory, etc. The modules shown in FIG. 2 can be implemented in hardware, software or a combination thereof.

Figure 3:
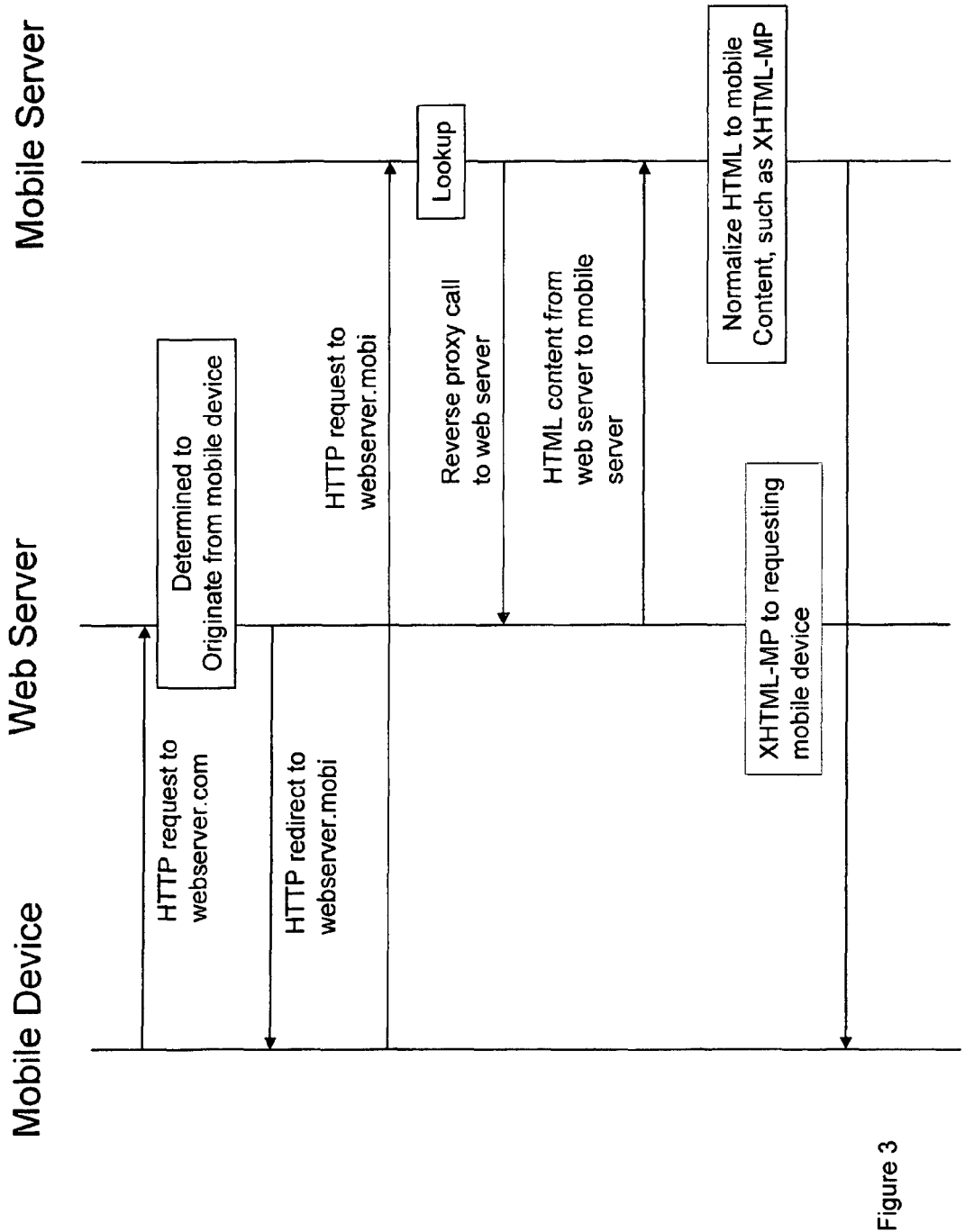
FIG. 3 illustrates a signal flow diagram of a method for generating and providing mobile content in accordance with an embodiment of the present invention.

FIG. 3 illustrates a signal flow diagram for generating and providing mobile content in accordance with one embodiment of the present invention. In this embodiment, a mobile device issues a request to the web server for a non-mobile web site. The web server can recognize the request as originating from a mobile device by examining aspects of the request, such as, among other things, embedded meta code that can include browser identifiers, flags, source addresses, etc., contents of the URL, the source IP address, etc. The web server can redirect the mobile device to query the mobile server. The mobile server can determine that the web content is not locally hosted on the mobile server and can perform a lookup to identify the address of the remote location where the remote content is hosted. The lookup is performed using a database that correlates information contained in the redirected request from the mobile platform with an address of remotely hosted content that is responsive to the request.

Using information obtained from the lookup, the mobile server can send a reverse proxy request to the identified remote web server. Although FIG. 3 shows the reverse proxy request going to the web server that received the original request from the user, the reverse proxy call can go to any web server, even one that is different from that which received the initial request from the mobile device. The mobile server can then obtain HTML-based content from the web server. The mobile server normalizes (converts) this content into a form that is useful to the requesting mobile device and returns it to that device.

In accordance with various embodiments of the present invention, an advertisement can be inserted into the content for delivery to the mobile device. Likewise, media content (e.g., WAV, MP3, QuickTime, etc.) may be converted into another format, e.g., a WAV file may be converted into an MP3 file. Media content may also be modified to play on the target mobile device.

Figure 4:
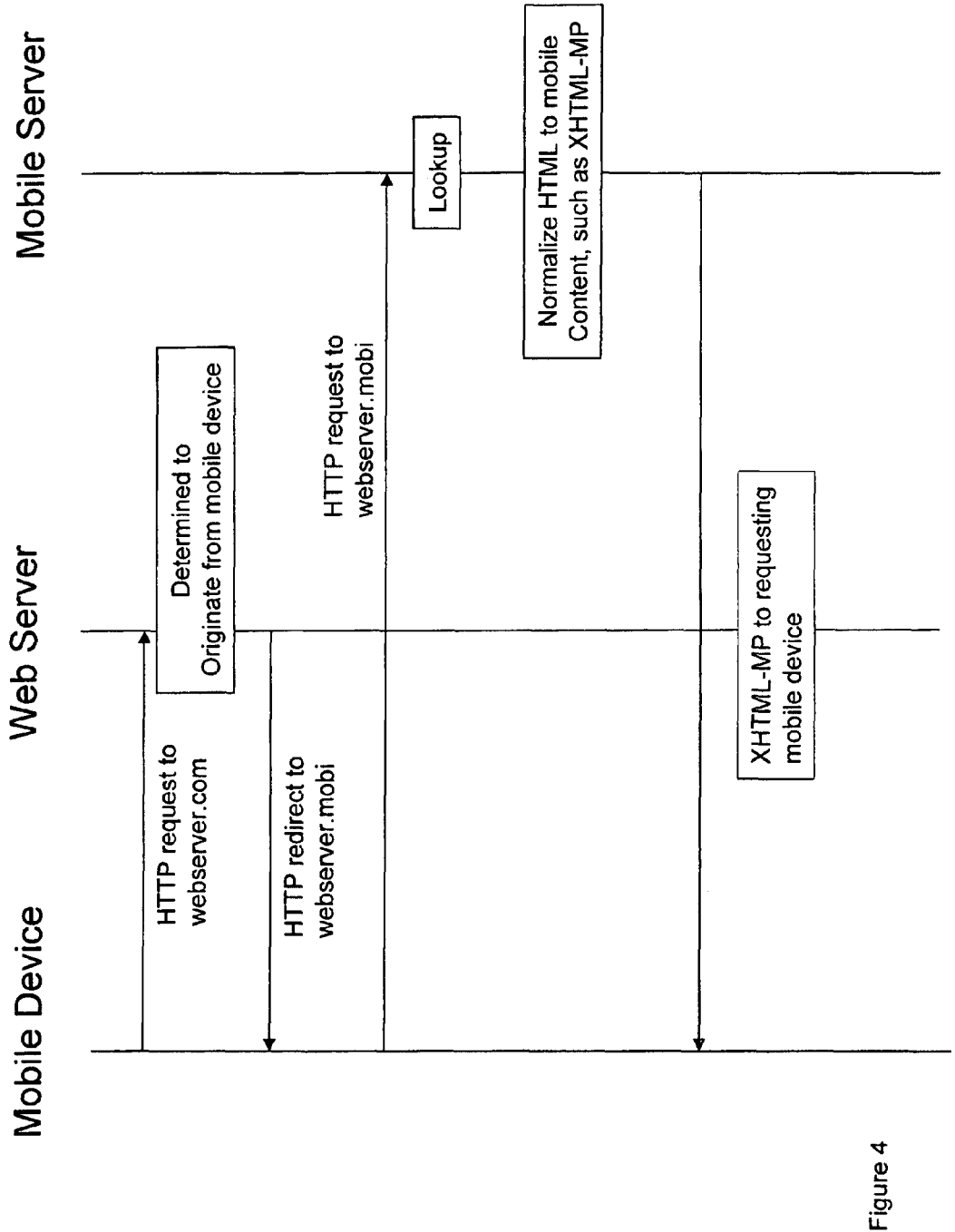
FIG. 4 illustrates a signal flow diagram of a method for generating and providing mobile content in accordance with an embodiment of the present invention.

FIG. 4 illustrates a signal flow diagram of a method for generating and providing mobile content in accordance with an embodiment of the present invention. Here, the requested web content is hosted locally at the mobile server. Thus, a reverse proxy request is not necessary. Rather, after determining that the content is locally hosted in a lookup step, the mobile server locates the content on a local hard disk, normalizes it and sends it to the requesting mobile device. The locally stored content can be in the local memory (e.g., RAM, hard disk, etc.) of the mobile server, or accessible to the mobile server via a Local Area Network or a Wide Area Network.

The mobile server 103 can provide additional services in making non-mobile content available and useful to mobile devices. For example, the mobile server can authenticate the requesting mobile device before providing the requested content. Likewise, the mobile server can provide substitute software functionality that may be present in the non-mobile web site by storing in the database 204 or 205 records that correlate commonly used non-mobile web application programs with mobile-enabled application programs. For example, a media player on the non-mobile site may be correlated to a media player adapted to be executed on the mobile device. The mobile media player may be substituted for the non-mobile player as part of the normalization process. This can be done differently depending upon the specific type of mobile device making the request. For example, the database may include records that correlate the non-mobile application with the type of requesting mobile device and one or more media players that can run on that mobile device. The record can also correlate specific attributes of content (e.g., size, encoding scheme, digital rights management scheme, etc.) on the non-mobile site with attributes of the requesting mobile device (e.g., manufacturer, model identifier, etc.) and suitable application programs for use on the mobile device for rendering the content. In this way, the mobile server can better normalize the non-mobile content for the requesting mobile device. The normalization process can include converting the format and other properties of content at web site so that the content can be rendered and used on the mobile device. For example, a WMV-formatted video can be converted into an MPEG-4 video to be able to be rendered on a mobile device with a MPEG-4 player. The frames of the video can be resized or cropped to make it easier to view on a mobile device. Digital rights management information associated with the video may be changed, e.g., a video that can only be viewed without skipping ahead on a non-mobile platform may be permitted to be viewed with a fast-forward feature on a mobile device. Different advertisements may be inserted into content as part of the normalization process for a mobile device. In other words, a first advertisement may be inserted into the content when the request is not determined to originate from a mobile device, while a second advertisement may be inserted when the request is determined to originate from a mobile device. In some embodiments, the second advertisement may be the first advertisement that has been reformatted and/or otherwise adjusted to be properly rendered on the mobile device. In other embodiments the second advertisement may be for a different product or service than the first advertisement. Advertisements can be selected to target a mobile device user.

It should also be noted that different mobile devices may have different normalization requirement to transform standard content to mobile-device-compatible format for particular devices or types of devices. In accordance with embodiments of the present invention, device profiles for individual devices and/or types of devices may be stored in a database and used by the system in accordance with the present invention to properly normalize standard content to mobile content. Thus, when a request for content is received, the identity of the individual device or device type can be ascertained. This can be done in any suitable way, such as by examining embedded meta code in the flow of information between the requesting device and the recipient of the content request, such as browser identifiers, flags, source addresses, etc., contents of the URL, the source IP address, etc. Information about the device identity or device type can be used to look up a profile from the profiles database. Standard content can be obtained and then normalized in accordance with information contained in the retrieved profile. For example, a profile may specify the preferred or required format of the normalized content, e.g., XHTML-MP, WML, etc., mobile provider, mobile phone number, privacy settings, parental control settings, display parameters, etc. When the standard content has been normalized to mobile content in accordance with the profile, the mobile content can be sent to the mobile device.

Several embodiments of the present invention are specifically illustrated and described herein. However, it will be appreciated that modifications and variations of the present invention are covered by the above teachings and within the purview of the appended claims without departing from the spirit and intended scope of the invention.

In general, certain embodiments of the present invention can provide a method for providing mobile content based on standard content. A content request can be received from a mobile device and an address of a web server that hosts standard content can be determined. Based upon this determination, a reverse proxy call can be sent to the web server that hosts the standard content. The standard content can be obtained from the web server and transformed to mobile content, i.e., content compatible with a mobile device. The transformed content ("mobile content") can be provided to the requesting mobile device.

The address of the web server that hosts the standard content can be determined by searching a database using a query that can be based upon information contained in the content request. The query can identify a record that correlates the standard content with at least one address of a standard content web server.

The standard content can be transformed from HTML-based content into any suitable mobile-compatible content, such as XHTML-MP-based content.

A system in accordance with an embodiment of the present invention can include a receiver module operative to receive a content request from a requesting entity and a standard content fetcher operative to look up a location of the requested content. If the location of the content is remote, the standard content fetcher can issue a reverse proxy call to fetch the requested content, which is standard, non-mobile content. If the location of the content is determined to be local, then requested content can be obtained from a local server. The content on the local server is standard, non-mobile content. A standard-to-mobile content normalizer operative can normalize the standard content into mobile content and send the normalized mobile content to a mobile device. The normalized content can be in any suitable format for a mobile device, such as XHTML-XP-based content.

Although the foregoing description has illustrated the present invention in the context of converting standard content to mobile content, those of skill in the art will appreciate that embodiments of the present invention can be used to convert any content from a format into a second format. For example, an embodiment of the present invention can be used to convert mobile content to standard content. In other words, embodiments of the present invention can be used to convert content that is adapted to be rendered by a first device or first type of device into content that is adapted to be rendered by a second device or second type of device. Thus, embodiments of the present invention may be used to convert content stored as text into content to be rendered as speech, and vice versa; convert content stored as video into content to be rendered as stills, and vice versa; etc.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing mobile content based on standard content, the method comprising:
   receiving, at a first server, a plurality of requests for content, each request received from either a mobile device or a standard device;
   determining that at least one of the plurality of requests is a mobile request that originated from a mobile device;
   redirecting the mobile request to a standard-to-mobile conversion server;
   receiving the mobile request at the standard-to-mobile conversion server;
   identifying a hosting web server that hosts the requested content from among a plurality of hosting web servers;
   sending a reverse proxy call from the standard-to-mobile conversion server to the identified hosting web server for the standard content as requested by the mobile device user;
   receiving at the standard-to-mobile conversion server the requested standard content from the identified hosting web server;
   determining a mobile device profile based upon information about the requesting device derived from the mobile request for content;
   converting the standard content to mobile content by replacing code in the requested content with code that provides at least partly equivalent functionality on the mobile device, based at least partly upon the determined profile;
   sending the mobile content to the mobile device;
   determining that at least another one of the plurality of requests is a non-mobile request that originates from a non-mobile standard device; and
   responsive to the non-mobile request, serving the standard content to the non-mobile device unaltered by the standard-to-mobile conversion server; and
   storing the requested content on the web server in a first format adapted to be rendered using a first type of media player, wherein the converting the standard content to mobile content based at least partly upon the determined profile comprises converting the requested content to a second format that is adapted to be rendered by a second type of media player on the mobile device.

2. The method of claim 1, wherein the converting the standard content to mobile content based at least partly upon the determined profile comprises inserting at least one advertisement adapted to be rendered by the mobile device.

3. The method of claim 1, wherein the step of determining that the mobile request originates from the mobile device comprises analyzing the user agent string received with the request.

4. A method for providing mobile content based on standard content the method comprising:
   receiving, at a web server hosting standard content, a first request for the standard content from a non-mobile standard device;
   receiving, at the web server hosting standard content, a second request for content from a mobile device;
   determining that the second request is a mobile device request that originates from the mobile device;
   redirecting the second request to a standard-to-mobile conversion server;
   sending a reverse proxy call from the standard-to-mobile conversion server for the standard content as requested by the mobile device request;
   sending to the standard-to-mobile conversion server the requested standard content;
   converting the standard content to mobile content by replacing code in the requested content with code that provides at least partly equivalent functionality on the mobile device;
   sending the mobile content to the mobile device;
   responsive to the first request, serving the standard content to the non-mobile device unaltered by the standard-to-mobile conversion server; and
   storing the requested content on the web server in a first format adapted to be rendered using a first type of media player, wherein the converting the standard content to mobile content comprises converting the requested content to a second format that is adapted to be rendered by a second type of media player on the mobile device.

5. The method of claim 4, wherein the determining that the second request originates from the mobile device comprises analyzing the user agent string received with the request.

6. The method of claim 4, wherein the converting the standard content to mobile content comprises inserting at least one advertisement adapted to be rendered by the mobile device.

7. The method of claim 4, wherein the converting the standard content to mobile content comprises retrieving a mobile device profile based upon information about the requesting device derived from the request for content and converting the standard content to mobile content based at least partly upon the profile.

8. The method of claim 4, further comprising:
   receiving the second request at the standard-to-mobile conversion server;
   looking up a URL for the standard content based upon the second request;
   receiving the requested standard content at the standard-to-mobile conversion server;
   converting the received standard content into content to be rendered by the mobile device; and
   sending the converted content to the mobile device.

9. The method of claim 8, further comprising:
   sending to the standard content server at least one credential to authenticate the requesting user to the standard content server; and
   receiving from the standard content server content that is available only to an authenticated user.

10. The method of claim 8, wherein the requested content is stored on the standard content server in a first format adapted to be rendered using a first type of media player and wherein the converting the received standard content into content to be rendered by the mobile device comprises converting the requested content to a second format that is adapted to be rendered by a second type of media player on the mobile device.

11. The method of claim 10, wherein the converting the received standard content into content to be rendered by the mobile device comprises inserting at least one advertisement adapted to be rendered by the mobile device.

12. A method for providing mobile content based on standard content, the method comprising:
   receiving, at a first server, a plurality of requests for content, each request received from either a mobile device or a standard device;
   determining that at least one of the plurality of requests is a mobile request that originated from a mobile device;
   redirecting the mobile request to a standard-to-mobile conversion server;
   receiving the mobile request at the standard-to-mobile conversion server;
   identifying a hosting web server that hosts the requested content from among a plurality of hosting web servers;
   requesting the standard content from the identified hosting web server;
   receiving at the standard-to-mobile conversion server the requested standard content from the identified hosting web server;
   determining a mobile device profile based upon information about the requesting device derived from the mobile request for content;
   transforming the web content in real-time to mobile-device-compatible content;
   sending the mobile content to the mobile device;
   determining that at least another one of the plurality of requests is a non-mobile request that originates from a non-mobile standard device; and
   responsive to the non-mobile request, serving the standard content to the non-mobile device unaltered by the standard-to-mobile conversion server.

13. The method of claim 12, wherein the step of transforming the web content in real-time to mobile-device-compatible content further comprises normalizing the HTML version of the requested content output from the hosting web site to XHTML-MP. The XHTML-MP content is then served to the requesting mobile device.

* * * * *